United States Patent [19]

Herziger et al.

[11] Patent Number: 4,596,030
[45] Date of Patent: Jun. 17, 1986

[54] APPARATUS FOR GENERATING A SOURCE OF PLASMA WITH HIGH RADIATION INTENSITY IN THE X-RAY REGION

[75] Inventors: Gerd Herziger, Rossdorf; Willi Neff, Michelstadt, both of Fed. Rep. of Germany

[73] Assignee: Carl Zeiss Stiftung, Heidenheim/Brenz, Fed. Rep. of Germany

[21] Appl. No.: 648,298

[22] Filed: Sep. 7, 1984

[30] Foreign Application Priority Data

Sep. 10, 1983 [DE] Fed. Rep. of Germany ....... 3332711

[51] Int. Cl.[4] .......................... H01J 35/00; G21B 1/00; G21K 5/00; G21K 7/00
[52] U.S. Cl. ............................... 378/119; 315/111.71; 376/145; 378/34; 378/43; 378/122
[58] Field of Search .................... 378/119, 34, 122, 43; 376/145, 143, 144; 315/111.21, 111.71, 111.81

[56] References Cited

U.S. PATENT DOCUMENTS

| | | | |
|---|---|---|---|
| 3,388,275 | 6/1968 | Bettenhausen et al. | 378/122 |
| 3,946,236 | 3/1976 | Roberts et al. | 378/103 |
| 4,042,848 | 8/1977 | Lee | 378/119 |
| 4,368,538 | 1/1983 | McCorkle | 378/122 |

Primary Examiner—Bruce C. Anderson
Assistant Examiner—T. N. Grigsby
Attorney, Agent, or Firm—Hopgood, Calimafde, Kalil, Blaustein & Judlowe

[57] ABSTRACT

A virtually punctiform plasma source of high-intensity radiation in the X-ray region is produced at the open downstream end of a gas-filled discharge space defined by and between concentric cylindrical inner and outer electrodes. At the closed upstream end, the electrodes which define this discharge space are directly connected to a low-inductance high-power switch which serves for momentarily connecting the electrodes to a source of stored electric energy. At the closed end of the discharge space, the inner electrode is concentrically surrounded by an insulator which has a high coefficient of secondary-electron emission. In closely opposed adjacency to the insulator region of the inner electrode is an annular emission electrode which is at the potential of the outer electrode, the emission electrode being positioned at close radial offset from the insulator, and the offset being less than the mean free path in the gas of the discharge space.

A gas discharge is produced in the discharge space at a well-defined distance downstream from the emitter electrode, and the discharge in a homogeneous plasma layer, which moves toward the open downstream end of the discharge space and there forms a plasma focus of extremely high particle density and small diameter, which focus provides the plasma source of X-radiation.

18 Claims, 7 Drawing Figures

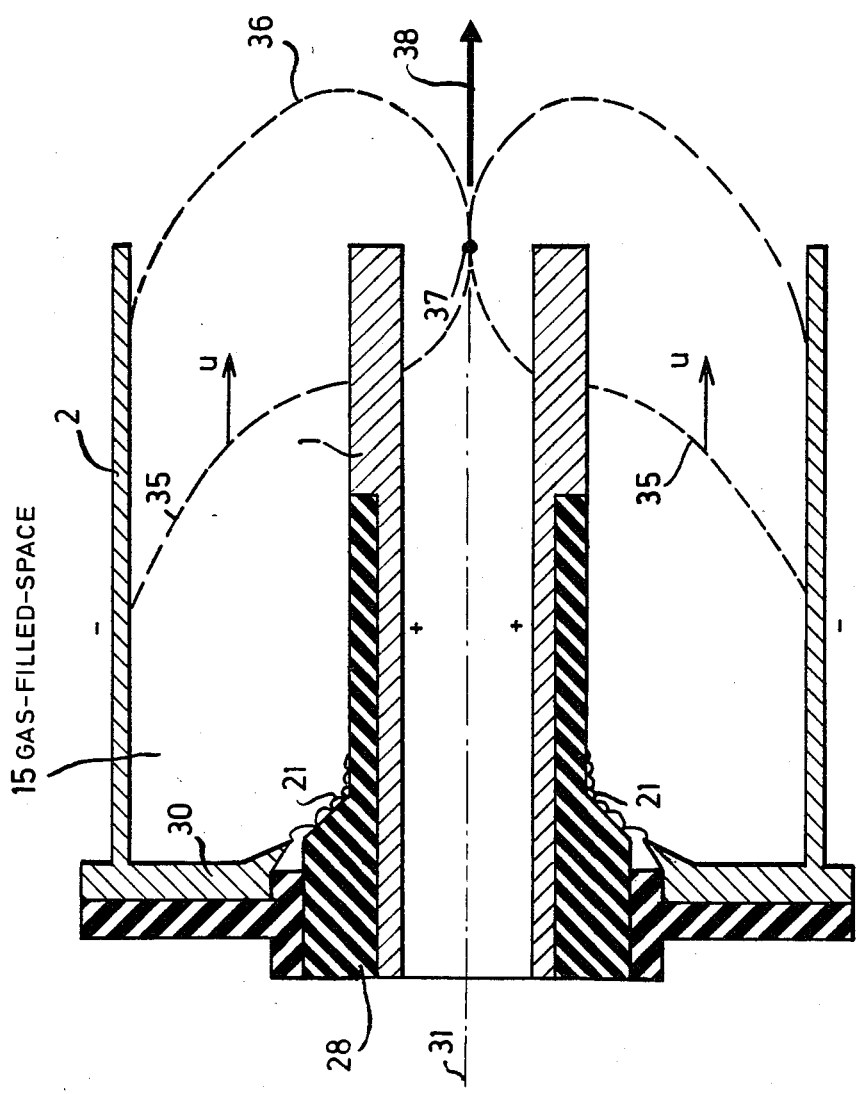

APPARATUS FOR GENERATING A SOURCE OF PLASMA WITH HIGH RADIATION INTENSITY IN THE X-RAY REGION

BACKGROUND OF THE INVENTION

The present invention relates to apparatus for producing a plasma source of high-intensity radiation in the X-ray region. More particularly, the invention pertains to a so-called "plasma-focus" device, comprising spaced inner and outer electrodes which extend from a closed supporting (or upstream) end to define a discharge space which is gas-filled and open to the other (or downstream) end, there being an annular insulator surrounding the inner electrode and extending from the closed end for a fraction of the extent of overlap of the electrodes, and there being provision for momentarily supplying pulses of stored energy to the closed ends of the electrodes.

In these devices, with each supplied pulse of stored energy, ionization processes occur in the gas of the discharge space, leading to the production of a thin plasma layer which moves with great speed toward the open end of the discharge space. After reaching this open end, the plasma is compressed by magnetic forces onto the axis of the inner electrode. Such compression of the plasma occurs that one speaks of a plasma focus here. This plasma focus is of approximately cylindrical shape, with diameters of 100 to 300 $\mu$m. X-radiation, inter alia, is produced in the plasma focus.

In known devices, the ionization processes at the closed end of the discharge space develop in uncontrolled manner, with resulting formation of individual spark channels, so-called "filaments". The resultant plasma layer is, therefore, not homogeneous but consists of a plurality of such filaments. Each of these filaments is surrounded by a magnetic field, and the magnetic fields around these filaments prevent maximum compression of plasma in the focus. The plasma focus thus has a focus diameter that is no longer reducible and, in particular, differs from discharge to discharge, i.e., the focus is not reproducible.

Due to the uncontrolled development of ionization processes in the gas space, the distribution of resultant filaments is not reproducible. The location of the resultant plasma focus is thus subject to certain variations.

Therefore, since neither the position nor the diameter of the plasma focus is reproducible in the known devices, such a focus cannot be used, for example, as a defined source of X-rays in X-ray optical instruments.

BRIEF STATEMENT OF THE INVENTION

The object of the present invention is to provide a device for producing an improved plasma source of high-intensity radiation in the X-ray region, which source compresses the plasma in such a reproducible manner (with great homogeneity and free of disturbance to production of high particle and energy densities) that it can be used as a virtually punctiform source of X-radiation, with focus of reproducible diameter and reproducible location.

The invention in a preferred form achieves this object by providing a plasma-focus device with a combination of the following features:

(a) at the closed end of the discharge space, a field-emission electrode, at the potential of the outer electrode, concentrically surrounds and converges toward the insulator in the downstream direction, such that the downstream end of the field-emission electrode clears the insulator surface with a radial offset d which is smaller than the mean free path of electrons in the gas of the discharge space;

(b) the material and the nature of the surface of the insulator are so selected that said surface has a high coefficient of secondary-electron emission; and (c) a high-power, low-inductance switch is so connected to the stored-energy source as to supply high-power fluxes with high rise rates via direct connection to the closed ends of the electrodes.

The field-emission electrode assures that a sufficiently high electron density, which reaches values of about $10^{10}/cm^3$, is available at a precisely defined place. These electrons are moved by the electric field in the discharge space toward the insulator of the inner electrode and, at the same time, in the direction toward the open (or downstream) end of the discharge space. The applied voltage between inner and outer electrodes is in the order of 20 KV, and, after traversing the offset d, these electrons attain such high kinetic energy ($>500$ eV) that they impinge directly on the surface of the insulator, i.e., without collisions in their short transit of gas space. Secondary electrons are thereby released at points of impact with the insulator surface. The secondary electrons are accelerated back onto the surface of the insulator, by reason of the potential gradient in the discharge space, in combination with the residual charge in the surface of the insulator, thereby producing new secondary electrons. This process takes place repetitively, the kinetic energy of the electrons continuously decreasing and gradually dropping to a value at which ionization processes occur in the gas space in the immediate vicinity of the insulator surface, with maximum probability of ionization. In other words, in the device according to the invention, the number of electrons emerging from the emitter electrode is multiplied, while at the same time their kinetic energy decreases, until the process reaches the maximum cross-section of electron/gas ionization collisions in the discharge space.

In this circumstance, the electrons are distributed uniformly over the surface of the insulator with very high density, as a consequence of the indicated action mechanism.

Ionization processes in the gas space therefore proceed in a well-defined manner with high electron density and homogeneous electron distribution, thus building homogeneous discharge. The resulting plasma layer is homogeneous, and the formation of filaments is avoided.

The special development of the switch between the energy source and the discharge space assures not only that sufficient energy is available at the start of the discharge, but also that sufficient further energy is supplied during the discharge process to avoid stoppage of the discharge.

The resultant homogeneous plasma layer is compressed into the focus in reproducible manner with great homogeneity and free of such disturbances as might otherwise compromise the development of high particle and energy densities. Particle densities ($>10^{20}$ $cm^{-3}$) which can be obtained in the plasma focus with the device of the invention are at least 10-times greater than values obtainable with known devices. The focus diameters obtained are less than values previously obtained, by a factor of 2 to 3.

Thus, the device of the invention, i.e., incorporating the above-noted combination of a plasma source is provided with characteristic position and diameter that are reproducible, by reason of the homogeneity of the discharge; and further, the plasma source has such a small diameter that it can be used to advantage as an effectively punctiform source of X-radiation in an X-ray optical instrument, as for example, in an X-ray microscope or in X-ray lithograpy apparatus.

Within the plasma focus, on the one hand incoherent X-radiation and on the other hand also coherent X-radiation are produced. The wavelengths of the incoherent radiation are determined by the gas or gaseous mixture used in the discharge space. They lie, for example, in the range of 15 to 20 Å or 24 to 40 Å.

Surprisingly, it has been found that, by the indicated measures, the plasma volume is compressed to smaller diameters than ever before noted and that in these plasmas there is a periodic structure of the electron densities with a structure length L which, in interaction with relativistic electrons which also occur in this plasma, lead to the emission of an intense monochromatic X-radiation. The wavelength $\Lambda$ is given by the relationship $$\Lambda = L/2\gamma^2,$$

wherein L is the spacing of the said structures, and $\gamma$ is the relativistic energy of the electrons.

The coherent, monochromatic X-radiation occurs within a small solid angle, for instance 0.16 rad, and the incoherent radiation is within a relatively large solid angle.

Aside from the above-noted features of the invention, there are important refining details in respect of the emitter electrode, the insulator, the outer electrode (to avoid spark discharge at the downstream end of the insulator), the inner electrode, and the involved gas.

DETAILED DESCRIPTION OF THE INVENTION

The invention will be illustratively described in detail, in conjunction with the accompanying drawings, in which:

FIG. 7 is a full section of components defining the discharge space, to show different stages in the development of the plasma focus.

Figure 1:
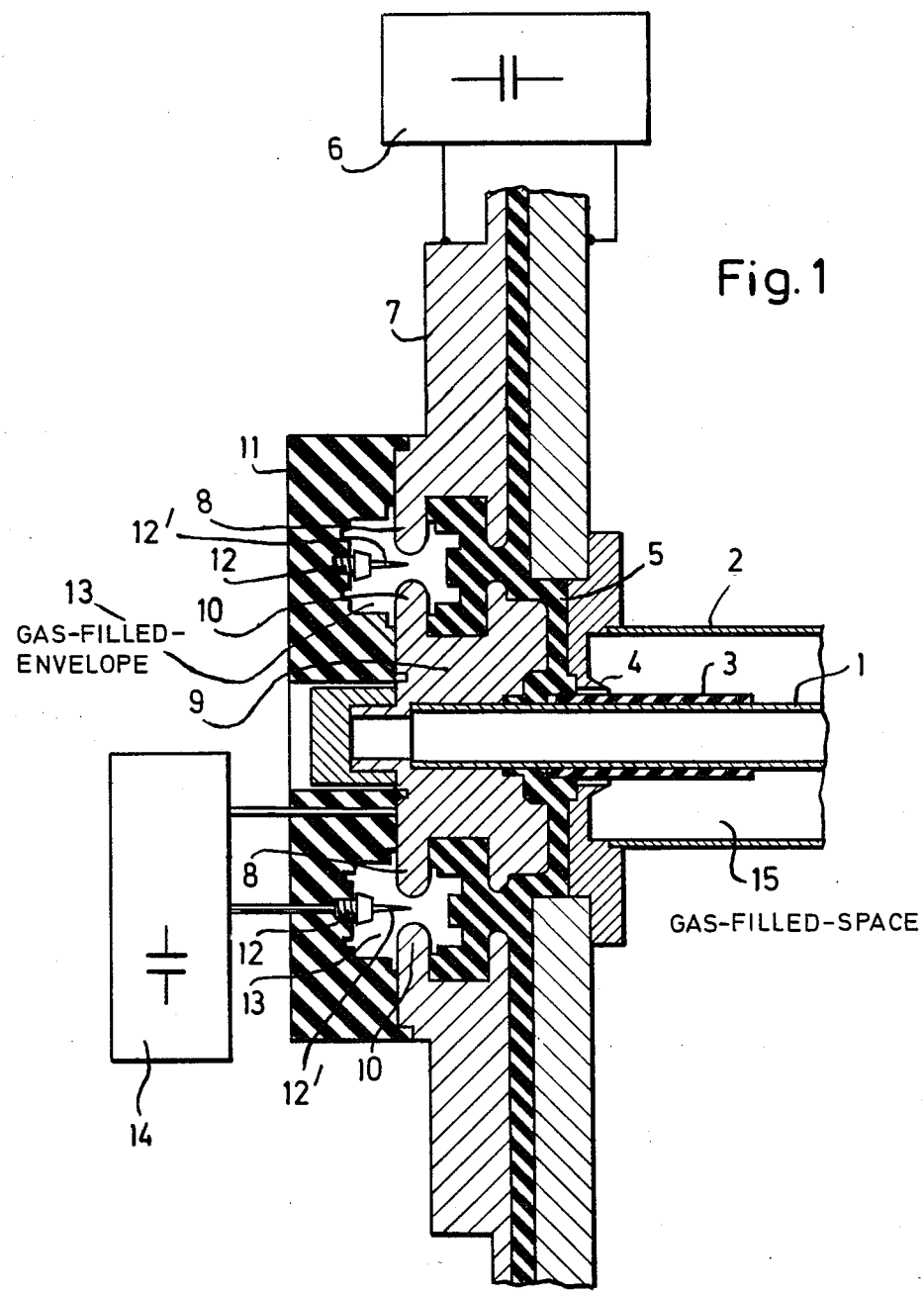
FIG. 1 is a view in longitudinal section through a first embodiment, showing components of a complete plasma-source generator.

In the embodiment of FIG. 1, a tubular inner electrode 1 is concentrically surrounded by a cylindrical outer electrode 2. These two electrodes are of material having good conductivity, as for example silver or copper, the outer electrode tube being preferably of perforated material. The inner electrode 1 is fitted with and surrounded by a tubular insulator 3, which may illustratively be of alumina in homogeneous polycrystalline form, a single-crystal sapphire, or glass available on the market under the trademark "Pyrex". The material of insulator 3 and the roughness of its surface are so selected that the insulator surface has a high secondary-electron emission coefficient $\eta$, lying for example, in the region of $\eta = 3$.

The discharge space 15 formed by electrodes 1 and 2 is open in the downstream direction (toward the right) and is closed off the left or supporting end, by an insulator 5 and a field-emission electrode 4 which is at the potential of the outer electrode 2. In the embodiment shown in FIG. 1, the electrode 4 is developed as an annular knife edge, converging inwardly, in the downstream direction. The section radius $r_o$ of this knife edge satisfies the relationship $V/r_o = 10^7$ V/cm, wherein V is the voltage applied between electrodes 1 and 2.

A high-power low-inductance switch, serving to deliver switched high-power flows with short rise times, is connected directly to the electrodes defining the discharge space 15. This switch delivers energy from storage means 6 to the discharge space. The energy storage means 6 can be developed as a capacitive energy storage of low inductance, but it is also possible to use an inductive storage device having high current capacity (>100 KA).

The high-power switch shown in FIG. 1 is developed as a triggered low-induction multi-channel spark gap. It consists of an annular outer-ring structural part 7, which is characterized by a plurality of equally spaced radially inward electrode formations 8. Another structural part 9 has corresponding but radially outward and equally spaced electrode formations 10 on a ring, with electrodes 10 in paired opposition to the electrodes 8 of outer ring 7. The pairs of electrodes 8, 10 are supported by insulators 5 and 11 to complete a closed annular space 13 of small volume. A ring 12 having trigger-electrode formations 12 is located to position each trigger-electrode between the electrodes 8 and 10 of each pair, and ring 12 is mounted to the insulator 11. The insulators 5 and 11 are both so developed that creep discharges and other disturbing effects are prevented. The space 13 is filled, for example, with gas, the type of gas and its density being optimized so that rise time and jitter time are minimized.

The trigger-electrode ring 12 is connected to its own energy source 14, which may be developed, for example, as a capacitive energy storage of low inductance.

After application of a high-voltage pulse, the trigger electrodes 12 are simultaneously fired within 500 ps. In this connection, energy is fed by the energy source 14 both to the spark gaps 8, 10 and to the discharge space 15, at high-power flows in the order of $10^8$ W/cm$^2$ and with high rise rates, in the order of $10^{17}$ W/cm$^2$. At the same time energy from storage means 6 is fed to the discharge space 15 via spark gaps 8, 10 so that sufficient energy is available during the whole discharge process.

Instead of the high-power switch of FIG. 1, whose resultant inductance lies in the region of 5 to 10 nH, other low-inductance, high-power switches can also be used; for example, a saturatable magnetic switch is suitable, provided that high-power flows can be switched with short rise times.

Figure 2:
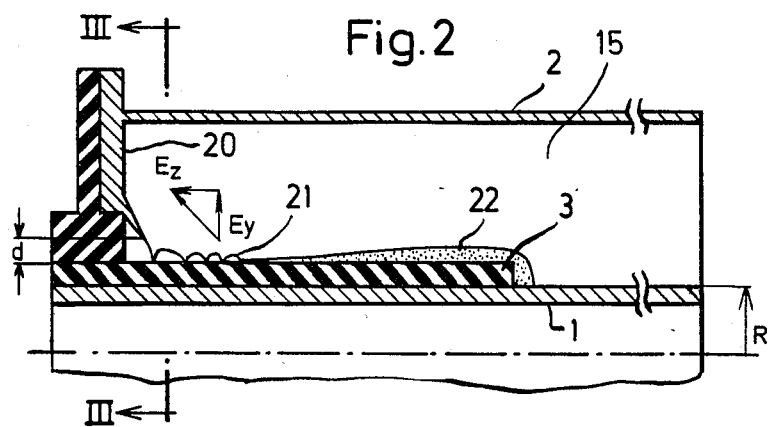
FIG. 2 is a fragmentary view in similar section, showing a second embodiment, localized to the discharge space.
Figure 3:
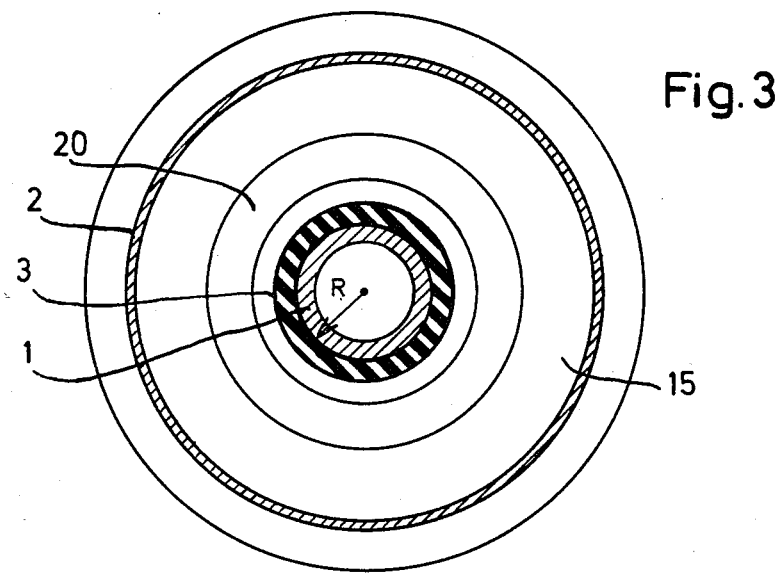
FIG. 3 is a section taken at line III—III of FIG. 2.

In the discharge-space configuration defined by electrodes 1 and 2 in FIGS. 2 and 3, an annular field-emission electrode 20 is provided, having the sectional shape of a knife edge (i.e., an annular knife edge), convergent in the downstream direction. The shape of this knife edge differs somewhat from the shape of the emitter electrode 4 shown in FIG. 1.

The discharge space 15 is filled with gas, which may, for instance, be pure hydrogen or a gas of higher atomic number Z such as helium. The gas may also consist of a mixture of hydrogen and a gas or gases of high atomic number Z (for instance noble gases or oxygen) or of a mixture of said high atomic number gases.

The outer radius R of the inner electrode 1 is adapted to the gas or gaseous mixture used, to satisfy the relationship:

$$R = \left( \frac{\mu_o \cdot I^2}{8\pi^2 \zeta_o u^2} \right)^{\frac{1}{2}}$$

wherein $\zeta_o$ is gas density in the discharge space, I is steady-state current, u is the desired velocity of the plasma disk, and, $\mu_o$ is the magnetic field constant.

The distance d between the knife edge of emitter electrode 20 and the surface of insulator 3 is so selected that electrons emerging from the knife edge of the electrode cannot collide with gas in the discharge space 15 on their path to the surface of insulator 3.

The high-power switch applies such a high voltage (about 20 KV) to the electrodes 1, 2 that a sufficient density of free electrons is obtained at the knife edge of the emitter electrode 20. This electron density may illustratively amount to $10^{10}$ cm$^{-3}$. With such an applied voltage, the kinetic energy of the electrons is so high (>500 eV) that the electrons emerging from the knife edge of the emitter electrode impinge directly on the surface of the insulator 3 without collisions in the gas space.

The electric fields present in the discharge space 15 are designated $E_y$ and $E_z$ in FIG. 2. They combine to form a resultant field which has an oblique course and, accordingly, each electron emerging from the knife edge of the emitter electrode 20 moves on an oblique path which is to the surface of the insulator 3 and also toward the free end of the discharge space. Upon electron impingement with the surface of the insulator 3, secondary electrons are liberated which, by reason of the controlling potential gradient in the discharge space, in conjunction with residual charge at the insulator surface, are accelerated back onto said surface, where new secondary electrons are produced. This process takes place repetitively with continously decreasing kinetic energy of the electrons, as indicated by electron path 21 in FIG. 2. The electrons are finally distributed uniformly over the insulator surface 3, as indicated at 22. Here the electrons reach the maximum effective cross-section for ionization collisions of the electrons with the gas, i.e., a plasma layer is formed between the electrodes 1 and 2 and moves with very high velocity towards the open end of the discharge space 15. Within the gas space, the ionization which leads to the formation of this plasma layer proceeds with such great electron density that the development of individual channels (filaments) is suppressed, and a homogeneous discharge is developed.

Figure 4:
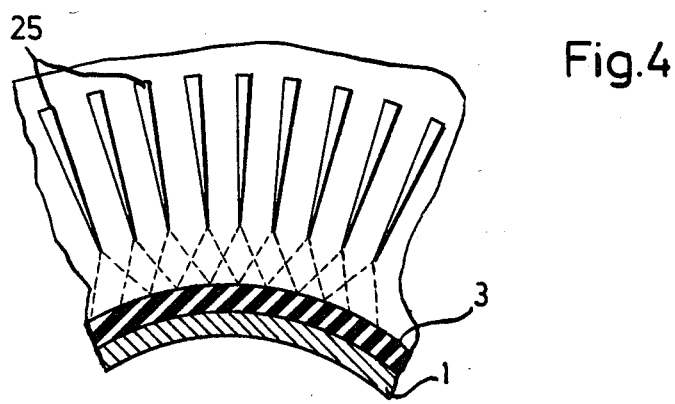
FIG. 4 is a section through one embodiment of the emitter electrode.

FIG. 4 shows emitter-electrode structure which is usable in place of the annular knife-edge electrode 20 of FIG. 2. The field-emission electrode of FIG. 4 consists of a ring of equidistantly spaced points 25 which may, for example, be developed individually but which may also be a formed structure of conductive fibers, as of carbon, embedded in a support medium. FIG. 4 illustrates that the points 25 are so positioned that emerging electrons are uniformly distributed at impingement on the surface of insulator 3.

Figure 5:
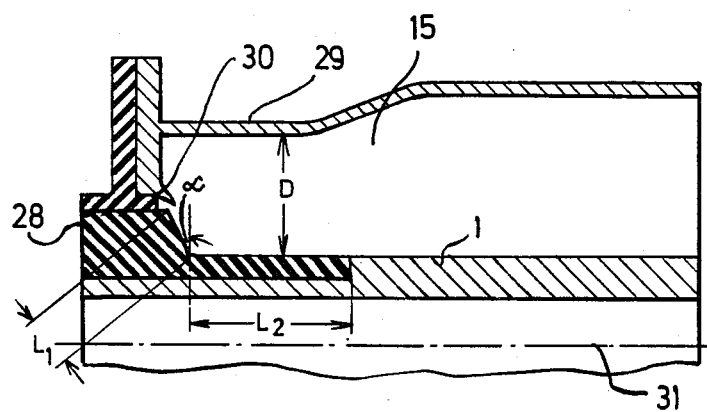
FIGS. 5 and 6 are views similar to FIG. 2, to show further embodiments of the discharge space.

In the embodiment of FIG. 5, an insulator 28 is so recessed, over a region of length $L_2$, into the inner electrode 1 that its outer diameter corresponds to that of the inner electrode. In its rear region, and facing the discharge end of a field-emission electrode 30, the diameter of the insulator increases linearly so that the surface of the insulator in this region forms an angle $\alpha$ with the plane normal to axis 31 of the inner electrode 1; the angle $\alpha$ is advisedly in the range between 20° and 40°.

This development of insulator 28 favors the path of electrons released from the electrode 30 (which is as described in connection with electrode 20 of FIG. 2), since movement of released electrons takes place in preferred fashion in the inclined region of the insulator 28, and toward the free end of the discharge space. For the insulator lengths $L_1$ and $L_2$ noted in FIG. 5, there are applicable relationships, namely:

$L_1 < L_2$, and $L_1 + L_2 = u \cdot t$, wherein u is the desired velocity of the plasma layer in the discharge space and wherein t, measured in nanoseconds, is between the values of 200 and 500.

The transition between the downstream end of the insulator (28 or 3) and the inner electrode 1 always forms a certain critical region. It is therefore advisable to develop the outer electrode in such a manner that the production of sparks is definitely avoided at this end of this insulator. In the embodiment of FIG. 5, this is effected in such manner that the distance D between the outer electrode 29 and the surface of the insulator 28 satisfies the relationship $p \cdot D < U_{Zmin}$, wherein p is gas pressure in the discharge space, and $U_{Zmin}$ is the minimal ignition voltage of the gas. In the embodiment of FIG. 5, the distance D of the outer electrode 29 satisfies the indicated relationship over the entire length of the insulator 28. Only in the downstream region does the diameter of the outer electrode 29 expand.

Figure 6:
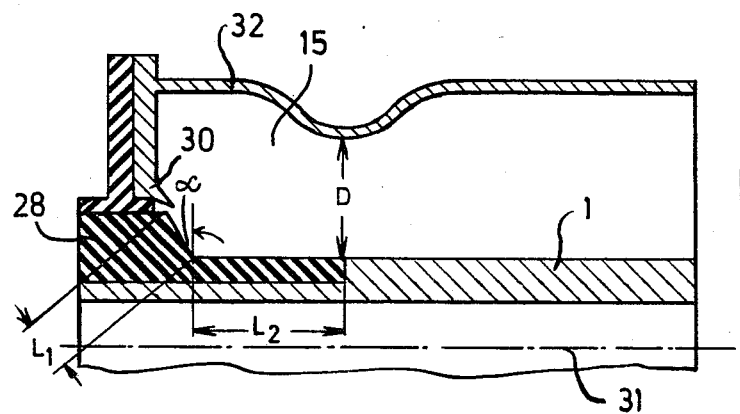

FIG. 6 shows another embodiment, in which the outer electrode 32 is so bent inward, solely in the region of the downstream end of the insulator 28, that its spacing D satisfies the above relationship.

FIG. 7 provides a basis for description of the invention in terms of producing the actual plasma focus. A high-power switch, such as the triggered low-induction multi-channel spark gap of FIG. 1, is the means of applying a high voltage, of say 20 KV, to electrodes 1 and 2 of the gas-filled discharge space 15. In this way, electrons are released with very high electron density at the point of the field-emission electrode 30 and move along the surface of the insulator 28 over the path 21 shown in the diagram. At initial electron impingement on the insulator sufrace 28, the kinetic energy of the electrons amounts to more than 500 eV, but this kinetic energy decreases while at the same time the number of electrons is multiplied, due to release of secondary electrons at the surface of insulator 28. The electrons distribute themsleves uniformly on the surface of the insulator and upon reaching the maximum effective cross-section for ionization collisions of the electrons with the gas of the discharge space, a homogeneous discharge is produced which gives rise to a plasma layer, indicated diagrammatically by 35 in FIG. 7.

This plasma layer 35 moves with a high velocity u in the direction toward the open end of the discharge space 15. Upon reaching this open end, the plasma is compressed by magnetic fields at the downstream end of the inner electrode 1 and finally develops the contour configuraton designated 36. Accompanying this configuration 36 is the production of the actual plasma focus 37, where the plasma is compressed in reproducible manner to high particle and energy densities. X-radiation is released at the plasma focus 37 and is indicated diagrammatically at 38.

It can be noted from FIG. 7 that the plasma focus 37 is extremely small and can be used as a virtually punctiform source of radiation.

As already described above, the X-radiation 38 which is liberated consists of a coherent part and a noncoherent part.

The plasma focus 37 can be used to advantage as the source of radiation in X-ray optical instruments, for example in an X-ray microscope, or in apparatus for X-ray lithography.

What is claimed is:

1. A device for producing a plasma source of highintensity radiation in the X-ray region, comprising a cylindrical inner electrode which at one end is surrounded annularly by an insulator and which, together with an outer electrode which surrounds it concentrically at a distance away D, forms a discharge space filled with gas of low pressure which is open toward the other end of the inner electrode, and a switch for momentarily connecting the ends of the electrodes located on the closed side of the discharge space with an electrical energy storage, characterized by the combination of the following features:
    (a) on the closed end of the discharge space, a field emission electrode (4) which is at the potential of the outer electrode (2) surrounds the insulator (3) concentrically at a distance d between the electrode point and the insulator surface, which distance d is smaller than the mean free path of the electrons in the gas of the discharge space;
    (b) the material and the nature of the surface of the insulator (3) are so selected that said surface has a high coefficient $\eta$ of secondary-electron emission ($\eta \approx 3$); and
    (c) a high-power switch of low inductance is connected to the energy storage (16) and serves to switch high power flows (about $10^8$ W/cm$^2$) with high rise rates (about $10^{17}$ W/cm$^2$.s) is directly connected to the electrodes (1, 2) of the discharge space, on the closed ends thereof.

2. A device according to claim 1, characterized by the fact that the field-emission electrode is developed as an annular knife edge (4, 20).

3. A device according to claim 1, characterized by the fact that the field-emission electrode consists of equally spaced points (25).

4. A device according to claim 1, characterized by the fact that the diameter of the insulator (28) in its rear region facing the field-emission electrode (30) increases linearly in such a manner that the surface of the insulator in this region forms an obtuse angle with the axis (31) of the inner electrode (1).

5. A device according to claim 1, characterized by the fact that the insulator (3, 28) which surrounds the inner electrode (1) is so recessed in said electrode that its outer diameter, at least over a part of the length L of the insulator corresponds to the diameter of the inner electrode (1).

6. A device according to claim 4, characterized by the fact that the total length L of the insulator satisfies the relationship $$L = u \cdot t,$$

wherein u is the desired velocity of the plasma layer in the discharge space and wherein t measured in nanoseconds is between 200 and 500.

7. A device according to claim 1, characterized by the fact that the distance D of the outer electrode (2) from the insulator in the region of the front end of the insulator (3, 28) satisfies the relationship $$p \cdot D < U_{Zmin}$$

in which p is the pressure of the gas in the discharge space and $U_{Zmin}$ is the minimum ignition voltage of this gas.

8. A device according to claim 7, characterized by the fact that the distance D of the outer electrode (29) satisfies said relationship over the entire length of the insulator (28) and widens in the front region of the outer electrode.

9. A device according to claim 7, characterized by the fact that the outer electrode (32) is so curved inward in the region of the front end of the insulator that the distance D satisfies the said relationship indicated in this region.

10. A device according to claim 1, characterized by the fact that the switch is developed as a triggered low-induction multi-channel spark gap (FIG. 1).

11. A device according to claim 10, characterized by the fact that the trigger electrodes (12) are at spaced equal distances on a support ring (11) and are arranged, together with the associated electrodes of the spark gap (8, 9) within a gas-filled or liquid-filled space (13) of small volume.

12. A device according to claim 11, characterized by the fact that an additional energy storage (14) is connected directly to the trigger electrodes (12).

13. A device according to claim 1, characterized by the fact that the space between inner and outer electrodes (1, 2) is filled with pure hydrogen or with gases of higher atomic number Z or with a mixture of said gases.

14. A device according to claim 1, characterized by the fact that the diameter R of the inner electrode (1) is selected in accordance with the gaseous mixture used.

15. A device according to claim 1, characterized by its use as source of coherent X-radiation.

16. A device according to claim 1, characterized by its use as source of incoherent polychromatic X-radiation.

17. A device according to claim 15 or claim 16, characterized by its use as source of radiation in an X-ray microscope.

18. A device according to claim 15 or claim 16, characterized by its use as source of radiation in lithography apparatus.

* * * * *